March 28, 1967  G. L. HALL  3,310,979

TENSILE TEST APPARATUS

Filed Oct. 31, 1963

United States Patent Office 3,310,979
Patented Mar. 28, 1967

3,310,979
TENSILE TEST APPARATUS
George L. Hall, Akron, Ohio, assignor to The Firestone Tire & Rubber Company, Akron, Ohio, a corporation of Ohio
Filed Oct. 31, 1963, Ser. No. 320,361
5 Claims. (Cl. 73—95)

The present invention relates to apparatus for determining properties of materials. More particularly, the invention relates to apparatus for measuring the tensile, stress-strain, elongation, tear and adhesion properties of elastomers of synthetic or natural rubbers, or reinforced elastomer vulcanizates, at elevated temperatures.

Recent advances in automotive, aviation and space industries have resulted in increasing demands in the fied of materials technology. One of the most frequently recurring problems is the requirement for reliable elastomer components for use in the 150° to 1000° F. temperature range. As a control, fast, accurate testing of samples is necessary to provide the requisite materials with a predictable service life.

Heretofore, equipments employing air and various fluids as the heating medium have been used for high temperature testing of materials. Fluid sealing problems, rapid heat loss in air systems, and complicated, time consuming loading and unloading procedures have kept these testing equipments from being entirely satisfactory.

Accordingly, a principal object of the present invention is to provide an improved high temperature tensile tester which allows the samples to be easily and quickly loaded and unloaded.

Another object is to provide a testing apparatus which will permit physical test data to be taken in the temperature range from 150° to 1000° F. under proper control.

A further object is to provide a high temperature test environment with a short pre-heating period.

An additional object is to provide tensile testing apparatus which can handle a variety of materials with a short test duration. These and other objects of the invention and advantages thereof will become apparent from the following description taken in conjunction with the accompanying drawing.

Figure 1:
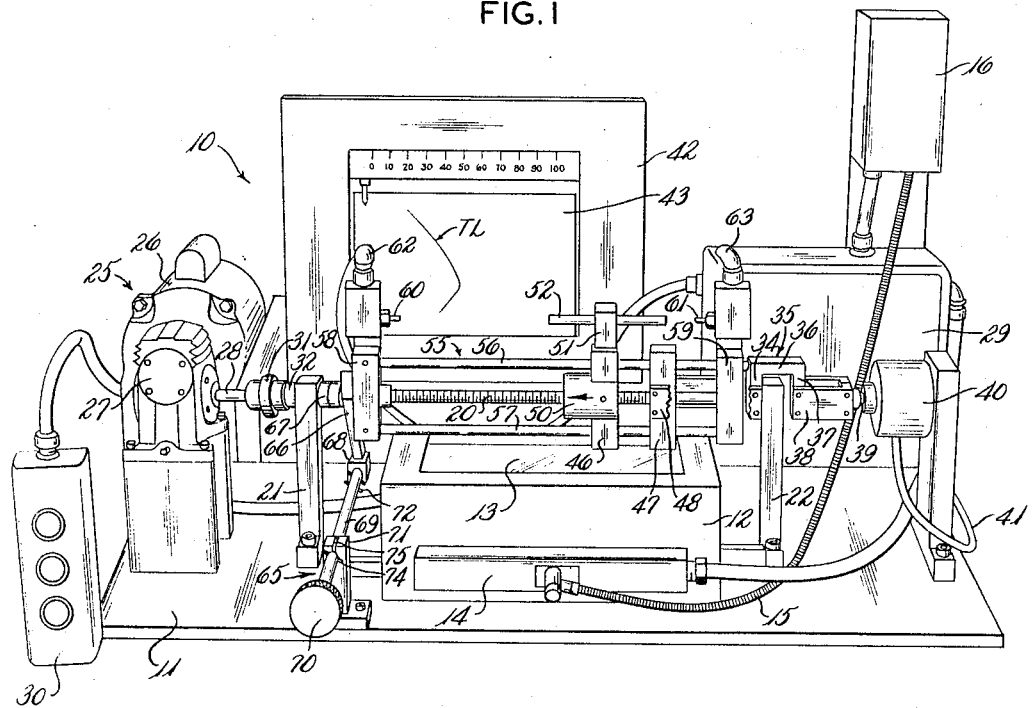
FIG. 1 is a view, in linear perspective, of the testing apparatus according to the invention, with the test sample immersed in the heating bath.

The testing apparatus according to the invention utilizes a molten liquid bath, maintained at a desired temperature in the range, for example, 150° to 1000° F. Mounted above the tank holding the liquid is a rotatable shaft carrying two testing arms. One arm is movably mounted on the shaft; the second arm is mounted in relatively fixed axial relation to the shaft. The test arms are moved apart to stretch or elongate a test sample to rupture. As the test sample is elongated, a sensing unit associated with the fixed arm provides an analog value which may be calibrated or mathematically converted to provide a measure of the tensile properties of the sample. Alternatively, the separation distance of the test arms at the moment of sample rupture could be measured to provide an empirical value for the tensile properties.

The testing apparatus, indicated generally by the numeral 10, may be mounted on a suitable lightweight base 11 of aluminum or similar material. The bath tank, generally designated as 12, is fabricated from an appropriate metal and insulated to reduce heat loss to the atmosphere. An opening is provided in the top of the bath tank 12 for immersion and testing of samples in the bath medium 13, preferably a low melting metal alloy such as Cerrobend. A lid (not shown) may be provided to cover the tank opening when not in use.

The bath medium is maintained in molten state, at the desired temperature, by a heating device 14 which is adjustable for a predetermined heat output. The heater 14 is connected by a cable 15 to a suitable relay box or thermoregulator indicated at 16 in FIG. 1.

Above the bath tank 12 is the primary horizontal component of the apparatus 10, a rotatable shaft 20 having a screw threaded medial portion. The horizontal shaft 20 is rotatably mounted above the bath tank 12 by stanchions or support posts 21 and 22 located on opposite sides of the test bath. Selective rotation of the shaft 20 is effected by a drive means indicated at 25, and located adjacent stanchion 21 and including a standard electric motor 26 coupled with a gear reducer 27 having an output shaft 28. Forward and reverse starters and a power supply for the motor are located in a junction box indicated at 29. A three position switch 30 controls the forward and reverse starters as well as providing a stop condition for the motor 26. A suitable coupling device 31, separated from stanchion 21 by a spacing collar 32, connects the reducer output shaft 28 to the driven end of shaft 20.

Adjacent the stanchion 22, the free rotating end of shaft 20 is preferably smooth, not threaded. This end of shaft 20 movably carries one depending leg 34 of an inverted U-shaped connecting yoke or member indicated at 35. The cross-bar 36 of the yoke 35 extends across the upper end of stanchion 22. The other depending leg 37 of the yoke 35 is connected as by a link member 38 to the shaft 39 of a load cell 40 suitably mounted above the base 11. As shown, the sensing unit or load cell 40 is of a conventional strain gage type and registers the axial force applied to the shaft 39 through the yoke 35. An analog signal from the load cell 40 may be transmitted as through a cable 41 to a recording instrument 42. The chart 43 of the recorder 42 will provide a trace line (TL) wherein the tensile force at rupture of the test sample S will be proportional to the peak amplitude of the curve on the chart. The recorded peak may be converted to obtain desired measure of tensile property by use of a constant.

The test samples S are prepared in suitable form, as for example an annulus or ring, which is carried between holding pins 44 and 45, on the lower ends of the relatively movable test arms 46 and 47. The holding pins 44 and 45, which may be rotatable, preferably have heads of increased diameter at the otuer end so that the test samples will not slide off before rupture.

The relatively fixed arm 47 has a bore slidably receiving the horizontal shaft 20. The arm 47 is rigidly attached to the leg 34 of the connecting yoke as by a link member 48 (partially broken away in FIG. 1). The forces applied to the pin 45 during elongation of the test sample S will be transmitted through the yoke member 35 and link member 38 to provide the relatively slight, very small movement of shaft 39 necessary to actuate the load cell 40.

The relatively movable arm 46 has a medial boss or collar 50 with an internal bore threaded to engage and mate with the threads on the medial portion of the horizontal shaft 20. The upper portion of arm 46 also has an extension 51 which carries a horizontal limit switch actuation rod 52, as described in further detatil below. Depending upon the pitch of the screw on shaft 20, the arm 46 may be laterally displaced or moved away from test arm 47 at any desired rate, for example, a rate of 20 inches per minute being optimum for test purposes.

It is preferred that the movement of the test arms 46, 47 relative to each other along the axis of shaft 20 be closely controlled to prevent damage to the apparatus 10. It is required that the test arms be simultaneously rotated about the axis of shaft 20 for loading of sample S on the holding pins 44, 45. These functions are provided by a carriage assembly indicated at 55 which includes two rods (56 and 57) extending parallel to and on opposite sides of the horizontal shaft 20. At either end, the rods are connected by cross blocks (58 and 59) rotatably mounted on the ends of shaft 20 between and adjacent the support posts 21 and 22.

The upper portions of the carriage assembly cross blocks 58 and 59 above rod 56 have extensions which carry conventional limit switches 60 and 61 in an opposed mounting. The switches 60 and 61, connected by suitable cables 62 and 63 to the junction box 29 and a stop control for motor 26, are selectively actuated by the switch rod 52 so that movement of the collar 50 along shaft 20 may be stopped or arrested to prevent damage to the carriage assembly 55 or the test arms 46, 47.

Rotational positioning of the carriage assembly 55, for loading of test samples S on the arms 46, 47, is effected by a control assembly indicated at 65. The control assembly 65 may be connected to the cross block 58 of the carriage assembly by a depending lever arm 66. The upper end of lever arm 66 is rotatable around the horizontal shaft 20 and is separated from stanchion 21 by suitable spacing collars 67. The bottom end of lever arm 66 carries a connecting block 68 which houses the inner end of a control rod 69 in a fixed axial but free rotational relation. The outer end of control rod 69 carries a knurled operating knob 70. The control rod 69 is slidably and rotatably supported above the base 11 by a control block 71.

Figure 2:
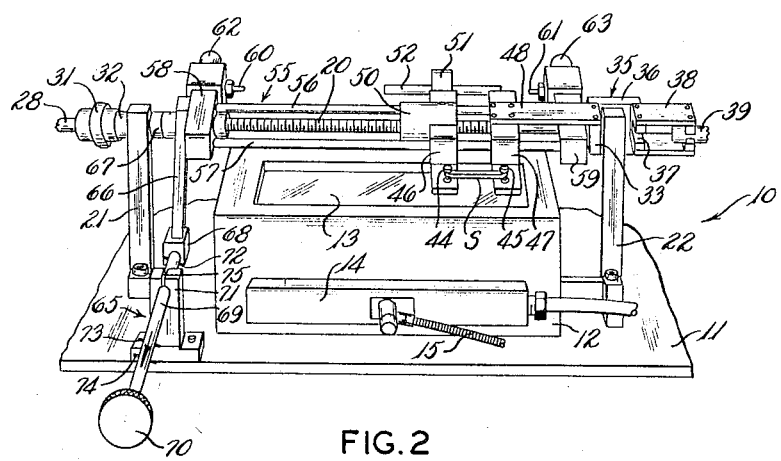
FIG. 2 is a fragmentary view, similar to FIG. 1, but showing the test arms in position for loading of the test sample.

The carriage control assembly 65 has means thereon to limit rotational travel of the carriage 55 and to lock the carriage 55 in the test position (FIG. 1). As best shown in FIG. 2, there are three transverse stop pins, 72, 73 and 74, inserted at suitable locations through the control rod. The control block 71 has a slot 75, aligned with the bore receiving the control rod 69, for selective passage of the stop pin 73 therethrough. When the control assembly 65 is operated to move the test arms 46, 47 out of the bath medium 13 for loading of test samples (FIG. 2), the inner stop pin 72 behind the control block 71 will limit outward sliding movement of control rod 69. When the test arms 46, 47 are to be moved into the bath medium 13, the medial pin 73 is aligned with the control block slot 75 and the control rod 69 is pushed inward and then rotated so that the medial pin 73 is just behind the control block 71. The outer control pin 74, just in front of the control block 71, will maintain the control rod 69 locked in the innermost position.

The test samples S are rings cut from molded cylindrical stock which has been cured or otherwise processed as desired. To maintain the force at failure within the capability of the apparatus 10, the width of the test sample S can be varied to increase or decrease the cross sectional area.

When immersed in the bath medium 13 the test sample S is subjected to a predetermined preheat period depending on the test temperature as set on the thermoregulator 16. The recording instrument 42 is then energized, and the forward button of switch 30 is pushed to start the electric motor 26. The collar 50 moves in the direction of the arrow (FIG. 1) due to rotation of shaft 20, until the sample fails. Preferably, the stop button of switch 30 will be employed to stop the travel of collar 50 before actuation rod 52 engages limit switch 60. After failure, the test sample S will float to the surface of the bath median 14 and can be retrieved for usual analysis.

The apparatus 10 can be rapidly returned to the FIG. 2 loading position for subsequent tests. The peak amplitude recorded on chart 43 of recording instrument 42 can be combined with a constant to determine stress. Ultimate elongation is available by measuring the separation of holding pins 44 and 45 or by measuring the length of the recorder trace TL and using a conversion factor. From this determination, strain can readily be computed. A number of identical samples of the same material may be tested and the results averaged to improve the accuracy.

The above description discloses apparatus for fast, accurate determination of the tensile properties of elastomeric materials at elevated temperatures. A preferred form of the invention has been shown and described in sufficient detail to enable one skilled in the art to practice the invention. It is apparent that various features and modifications of the invention, e.g., conversion of the liquid bath to a wet atmosphere containable in a tank, could be used in testing apparatus 10 without departing from the spirit of the invention. Therefore, the scope of the invention should be limited solely by the scope of the attached claims.

What is claimed is:

1. Apparatus to determine properties of test samples, comprising, a tank, a bath of molten liquid in said tank, a rotatable shaft (20) having a screw threaded medial portion mounted above said tank and bath, a first arm (46) mounted on the threaded portion of said shaft, a second arm (47) mounted in relatively fixed axial relation to one end portion of said shaft, a carriage assembly (55) to rotate said arms and a test sample carried between said arms into said bath, and drive means (25) to rotate said shaft and move said first arm away from said second arm to elongate to rupture a test sample immersed in said bath.

2. Apparatus according to claim 1 in which said carriage assembly carries switch means selectively actuated by movement of said first arm (46) and connected to said drive means to prevent damage to said carriage assembly or said arms.

3. Apparatus to determine the properties of test samples, comprising, a tank, a bath of molten liquid in said tank, a rotatable shaft mounted above said tank and bath, a first arm movably mounted on said shaft, a second arm mounted in relatively fixed axial relation to said shaft, a shaft mounted carriage assembly to simultaneously rotate said arms into or out of said bath, a control assembly (65) to limit the rotational travel of said carriage assembly and to lock said carriage assembly in a position with said arms immersed in said bath, and means to laterally displace said first arm along said shaft to elongate to rupture a test sample carried between said arms and immersed in said bath.

4. Apparatus to determine properties of test samples immersed in a bath of testing medium, said apparatus comprising a base (11), a tank (12) for said bath on said base, a horizontal shaft (20) above said tank and bath, stanchions (21 and 22) on opposite sides of said bath rotatably mounting said shaft, drive means (25) located on said base adjacent one of said stanchions (21) for selective rotation of said shaft, an inverted U-shaped connecting yoke (35) movably mounted on said shaft adjacent the other of said stanchions (22), said yoke including inner and outer derending legs (34 and 37) on opposite sides of said stanchions, a sensing unit (40) attached to said outer leg (37) of said yoke, a test sample carrying arm (47) movably mounted on said shaft and connected to said inner leg (34) of said yoke, another test sample carrying arm (46) mounted on said shaft and movable upon selective rotation of said shaft, a carriage assembly (55) located adjacent said stanchions for simultaneous movement of said test sample carrying arms around said shaft, and a control assembly (65) for rotating said carriage assembly and moving said test sample carrying arms into or out of said bath, said test sample carrying arms being moved relative to each other upon rotation of said shaft by said drive means, said sensing unit registering the force applied to the test sample carrying arm connected to said yoke during elongation of a test sample immersed in said bath.

5. Apparatus to determine properties of test samples, comprising, a tank, a bath of test medium in said tank, a shaft mounted above said tank and bath, a first arm movably mounted on said shaft, a second arm mounted in relatively fixed axial relation to said shaft, said arms adapted to hold a test sample, carriage means to rotatably immerse said arms and a test sample in said bath, drive means to move said first arm on said shaft to elongate said test sample, and a sensing unit cooperating with said second arm to provide an analog value which may be converted to provide a measure of the properties of said test sample during elongation.

References Cited by the Examiner

UNITED STATES PATENTS

| | | | |
|---|---|---|---|
| 1,208,748 | 12/1916 | Chew | 73—15.6 |
| 1,826,732 | 10/1931 | Chatillon | 73—15.6 X |
| 2,185,340 | 1/1940 | Howe | 73—95 X |
| 2,495,746 | 1/1950 | Lubin | 73—15.6 |
| 2,959,957 | 11/1960 | Smith et al. | 73—95 |

RICHARD C. QUEISSER, *Primary Examiner.*

J. W. MYRACLE, J. J. GILL, *Assistant Examiners.*